Patented July 17, 1923.

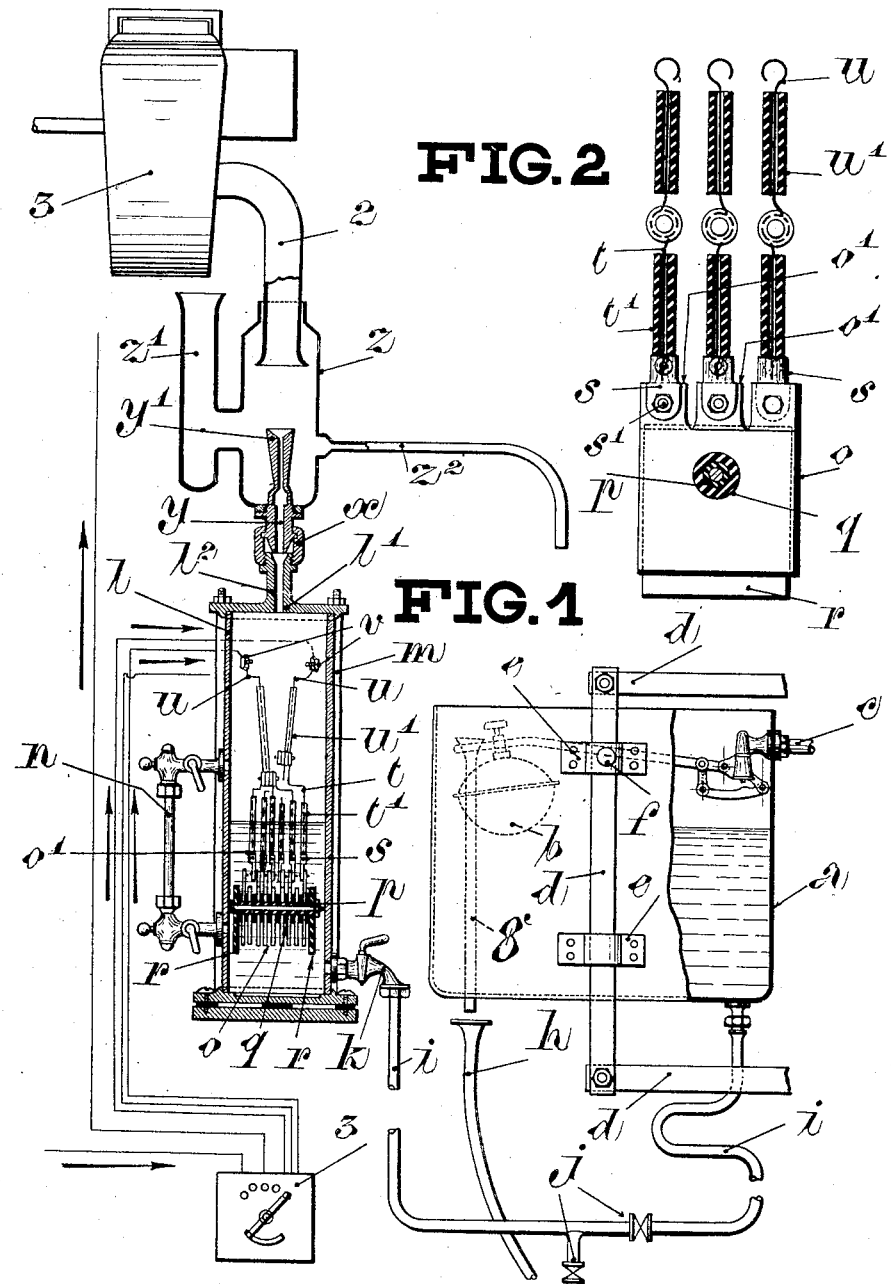

1,461,840

UNITED STATES PATENT OFFICE.

LOUIS EUGÈNE VIGNON, OF TARARE, FRANCE, ASSIGNOR TO LES SUCCESSEURS D'ALBERT GODDE, BEDIN & CO., OF LYON, FRANCE.

APPARATUS FOR HUMIDIFYING AIR.

Application filed March 28, 1922. Serial No. 547,395.

*To all whom it may concern:*

Be it known that I, LOUIS EUGÈNE VIGNON, a citizen of the French Republic, of Tarare, Rhone, France, have invented a certain new and useful Apparatus for Humidifying Air, of which the following is a specification.

This invention relates to an apparatus for the humidification of the atmosphere in certain industrial premises such as those used for spinning, weaving, etc.

An object of this invention is to provide for a humid atmosphere in which the air is fed regularly and with a constant water content per unit of volume, the water vapour being fully mingled with and regularly diffused through the volume of air.

A further object is to permit of the water vapour feed being regulated so that the air may be supplied with more or less water vapour as conditions may require.

By the present invention means are provided for the vaporization of water by electric heaters more or less immersed in a body of water, for varying the water level in the evaporating chamber, for delivering the vapour to and dispersing it in a stream of air in a mixing chamber and for withdrawing the humidified air from said mixing chamber and discharging it into the room or workshop.

In the annexed drawing,

Fig. 1 illustrates the whole apparatus.

Fig. 2 is a front detail view on an enlarged scale of electrodes employed for the vaporization of the water.

The apparatus comprises a water tank $a$ provided with a ball cock $b$ which cuts off the feed of the water to the tank through the pipe $c$ when a certain level is reached. This tank is supported by a double metal frame $d$ of which the horizontal arms are fastened to the supporting and the vertical arms pass under straps $e$ riveted to the tank.

Screws $f$ provide for fixing the tank at the desired height and allow of displacing it easily.

An overflow pipe $g$ in the tank $a$ provides for the outflow of the water into a discharge pipe $h$ in case the ball valve should not act.

The water from the tank $a$ is conducted through a pipe $i$ provided with suitable valves $j$ $k$ to the vaporization apparatus which constitutes an essential feature of the invention. This apparatus comprises a closed reservoir $l$ strengthened by tie rods $m$ and provided with a water gauge $n$. Inside it carries carbon electrodes $o$ mounted on an insulated shaft $p$ and separated from one another by mica washers $q$. Two lateral plates $r$ of fibre are pressed by nuts screwed on the shaft $p$ and assure the rigidity of the whole.

Each electrode $o$ has at its upper part a projection $o^1$ on which is applied a metal plate $s$ fixed by a screw $s^1$ and which establishes the electric connection with a wire $t$ insulated by a tube $t^1$.

For facilitating mounting, the projections $o^1$ are arranged alternately on each side and at the centre of each electrode (Fig. 2) and the different wires $t$ are connected in series to other wires $u$ insulated by tubes $u^1$ and connected to the terminals $v$ conveying the current.

The top plate $l^1$ of the reservoir $l$ is provided with a tube $l^2$ connected by a liquid tight union $x$ to another tube $y$ fixed to a chamber $z$ and terminated at the interior of the latter by a flattened part $y^1$ intended to produce the expansion of the jet of steam in said chamber. The latter is provided laterally with an air suction trumpet $z^1$ and a pipe $z^2$ intended to lead back to the tank $a$ the condensed water from the steam.

A suction conduit 2 extends into the chamber $z$ and leads to a fan 3 actuated by a small electric motor or by gearing of any kind.

The working of the apparatus is as follows; the electric current from a rheostat 4 passes to the terminals $u$ and to the various electrodes $o$ which heat the water contained in the reservoir $l$ and rapidly bring it to boiling point. The fan 3 being in action sucks air through the trumpet $z^1$ which mixes with the steam injected into the chamber $z$ through the tube $y$ and this mixture passing through the conduit 2 to the fan 3 is blown by the latter into the premises to be humidified.

The regulation of the degree of humidification in accordance to the size of the premises or the nature of the work carried on therein, is effected by regulating the amount of current fed to the electrodes and by varying the height of the water contained in the reservoir $l$ by raising or lowering of the water tank $o$ or by the regulating of the position of the float $b$.

What I claim as my invention and desire to secure by Letters Patent of the United States is:—

1. Apparatus for supplying humidified air comprising in combination a closed vessel, electrically operated heaters in said vessel adapted to vaporize water therein, means for supplying water to and maintaining a constant level thereof in said vessel, a mixing chamber having an open air inlet duct, means for dispersing in said chamber the steam produced in said vessel, a conduit connected to said mixing chamber, a fan adapted to suck the humidified air from said mixing chamber and force same into the premises to be humidified and means for rotating said fan.

2. Apparatus for supplying humidified air comprising in combination a water supply tank, means for adjusting the elevation of said tank, means for conveying water thereto, means for regulating the supply of water to said tank, to maintain a constant level therein, a closed vessel, a conduit connecting said supply tank to said vessel to convey water thereto and maintain an adjusted level of water therein corresponding to the elevation of said tank, electrically operated heaters in said vessel, a mixing chamber, having an open air inlet duct, means for dispersing in said chamber the steam produced in said vessel, a conduit connected to said mixing chamber, a fan adapted to suck the humidified air from said mixing chamber and force same into the premises to be humidified and means for rotating said fan.

3. Apparatus for humidifying air in factories or the like comprising in combination a water tank, means for adjusting the position of said tank, means for conveying water thereto, means for regulating the supply of water to said tank, a closed reservoir, a conduit connecting said tank to said reservoir to convey water thereto, an insulated shaft in said reservoir, carbon electrodes mounted on said shaft, insulating washers separating said electrodes on said shaft, metal plates fixed on said electrodes, terminals mounted on said reservoir, insulated wires connecting said plates to said terminals, means for supplying electric current to said terminals, a chamber means for conveying to said chamber the steam produced by said vaporizing means in said reservoir, means for introducing air into said chamber, a conduit connected to said chamber, a fan adapted to suck the air and steam from said chamber and force same into the premises to be humidified and means for rotating said fan.

In witness whereof I have signed this specification in the presence of two witnesses.

LOUIS EUGÈNE VIGNON.

Witnesses:
JULIAN KEMBLE SWEDBERG,
GUILLAUME PIOCHE.